US008252387B2

(12) United States Patent
Fleming et al.

(10) Patent No.: US 8,252,387 B2
(45) Date of Patent: Aug. 28, 2012

(54) METHOD OF FABRICATING OPTICAL FIBER USING AN ISOTHERMAL, LOW PRESSURE PLASMA DEPOSITION TECHNIQUE

(75) Inventors: James W. Fleming, Westfield, NJ (US); George J. Zydzik, Columbia, NJ (US)

(73) Assignee: OFS Fitel, LLC, Norcross, GA (US)

( * ) Notice: Subject to any disclaimer, the term of this patent is extended or adjusted under 35 U.S.C. 154(b) by 1293 days.

(21) Appl. No.: 12/001,174

(22) Filed: Dec. 10, 2007

(65) Prior Publication Data

US 2009/0148613 A1    Jun. 11, 2009

(51) Int. Cl.
*B05D 5/06* (2006.01)
*B05D 7/22* (2006.01)
*B05D 3/06* (2006.01)
*C03B 37/01* (2006.01)
*C03B 37/018* (2006.01)
*C03B 37/022* (2006.01)

(52) U.S. Cl. ........ 427/509; 427/487; 427/488; 427/508; 427/535; 427/569; 427/573; 427/162; 427/163.1; 427/163.2; 427/164; 427/165; 427/166; 427/169; 427/230; 427/237; 427/238; 65/391; 65/393; 65/413; 65/417; 65/436

(58) Field of Classification Search ................. 427/487, 427/488, 508, 509, 535, 569, 573, 162, 163.1, 427/163.2, 164–167, 230, 237, 238; 65/391, 65/393, 413, 417, 436
See application file for complete search history.

(56) References Cited

U.S. PATENT DOCUMENTS

| | | | | |
|---|---|---|---|---|
| 4,145,456 A | * | 3/1979 | Kuppers et al. | 427/575 |
| 4,262,035 A | * | 4/1981 | Jaeger et al. | 427/571 |
| 4,263,032 A | | 4/1981 | Sinclair et al. | |
| RE30,635 E | * | 6/1981 | Kuppers et al. | 427/573 |
| 4,314,833 A | * | 2/1982 | Kuppers | 65/391 |
| 4,331,462 A | * | 5/1982 | Fleming et al. | 65/391 |
| 4,349,373 A | * | 9/1982 | Sterling et al. | 65/60.8 |
| 4,405,655 A | * | 9/1983 | Tuin | 427/573 |
| 4,468,413 A | | 8/1984 | Bachmann | |
| 4,507,135 A | | 3/1985 | Morse | |
| 4,746,345 A | * | 5/1988 | Pluijms et al. | 65/391 |
| 5,211,731 A | * | 5/1993 | Busse et al. | 65/388 |
| 5,213,599 A | * | 5/1993 | Geertman et al. | 65/30.1 |

(Continued)

FOREIGN PATENT DOCUMENTS

GB    1 578 826 A    * 11/1980

*Primary Examiner* — William Phillip Fletcher, III
(74) *Attorney, Agent, or Firm* — Wendy W. Koba, Esq.

(57) ABSTRACT

An isothermal, low pressure-based process of depositing material within a substrate has been developed, and is particularly useful in forming an optical fiber preform results in creating an extremely narrow reaction zone within which a more uniform and efficient deposition will occur. Sets of isothermal plasma operating conditions have been found that create a narrow deposition zone, assuring that the deposited material is clear glass rather than soot particles. The exhaust end of the tube is connected to a vacuum system which is in turn connected to a scrubber apparatus for removal and neutralization of reaction by-products. The operating conditions are selected such that the hot plasma does not transfer a substantial amount of heat to the substrate tube, where the presence of such heat has been found to result in vaporizing the reactant material (creating soot) and developing hot spots.

13 Claims, 3 Drawing Sheets

U.S. PATENT DOCUMENTS

| | | | |
|---|---|---|---|
| 5,397,372 A * | 3/1995 | Partus et al. | 65/391 |
| 5,681,611 A * | 10/1997 | Yoshikawa et al. | 427/163.2 |
| 5,692,087 A * | 11/1997 | Partus et al. | 385/123 |
| 6,105,396 A * | 8/2000 | Glodis et al. | 65/377 |
| 6,305,195 B1 | 10/2001 | Fleming, Jr. et al. | |
| 7,156,046 B2 | 1/2007 | Tamagaki et al. | |
| 2005/0022561 A1 * | 2/2005 | Guskov et al. | 65/391 |
| 2005/0284184 A1 | 12/2005 | Baynham et al. | |
| 2007/0003197 A1 | 1/2007 | Matthijsse et al. | |

* cited by examiner

| TUBE ID | TUBE OD | Vac | KV | Amps | kW | He | Ar | O$_2$ | SiCl$_4$ | C$_2$F$_6$ | GeCl$_4$ | OD T | ID T | TRANSVERSE | PLAS LEN | TRAV LEN |
|---|---|---|---|---|---|---|---|---|---|---|---|---|---|---|---|---|
| mm | mm | mbar | | | | cc/min | cc/min | cc/min | cc/min | cc/min | cc/min | °C | °C | cm/min | cm | cm |
| 28 | 32 | 10 | 4 | 2.68 | 10.7 | | 500 | 160 | 100 | 100 | | 1000 | 1098 | 200 | 6 | 80 |
| 19 | 25 | 3 | 4 | 2.68 | 10.7 | | 500 | 160 | 100 | 0 | 25 | 1000 | 1234 | 200 | 6 | 80 |
| 46 | 50 | 5 | 4 | 2.68 | 10.7 | | 500 | 160 | 100 | 0 | 50 | 1000 | 1029 | 400 | 6 | 80 |
| 28 | 32 | 2.5 | 4 | 2.68 | 10.7 | | | 160 | 200 | 0 | 100 | 1000 | 1024 | 800 | 6 | 80 |
| 28 | 32 | 2.5 | 3.6 | 2.68 | 9.6 | 500 | 500 | 160 | 200 | 0 | 100 | 1000 | 1022 | 800 | 6 | 80 |

← PRECURSOR CHEMICALS →

LOW PRESSURE RF PLASMA
NON-ISOTHERMAL
(a)

ISOTHERMAL
(b)

METHOD OF FABRICATING OPTICAL FIBER USING AN ISOTHERMAL, LOW PRESSURE PLASMA DEPOSITION TECHNIQUE

TECHNICAL FIELD

The present invention relates to a plasma technique for depositing material in a substrate tube and, more particularly, to an isothermal, low pressure process that results in creating an extremely narrow reaction zone in the tube within which a more uniform and efficient deposition will occur.

BACKGROUND OF THE INVENTION

Optical fiber typically contains a high-purity silica glass core optionally doped with a refractive index-raising element (such as germanium), an inner cladding of high-purity silica glass optionally doped with a refractive index-lowering element (such as fluorine), and an outer cladding of undoped silica glass. In some manufacturing processes, the preforms for making such fiber are fabricated by using a glass tube for the outer cladding (referred to as an overcladding tube), and separately forming a core rod containing the core and inner cladding material. The core rods are fabricated by any of a variety of vapor deposition methods known to those skilled in the art, including vapor axial deposition (VAD), outside vapor deposition (OVD), and modified chemical vapor deposition (MCVD). MCVD, for example, involves passing a high-purity gas, e.g., a mixture of gases containing silicon and germanium, through the interior of a silica tube (also referred to as a "substrate tube") while heating the outside of the tube with a traversing oxy-hydrogen torch. In the heated area of the tube, a gas phase reaction occurs that deposits particles on the tube wall. This deposit, which forms ahead of the torch (referred to as "downstream"), is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into the final preform structure.

As an alternative to MCVD, a plasma chemical vapor deposition (PCVD) process may be used. In the PCVD method, the substrate tube passes through a microwave applicator (also referred to as an activator chamber, or activator head), which forms an electro-magnetic field around and inside the tube. A non-isothermal, low-pressure plasma is generated inside the tube by the interaction of the electromagnetic field with the feed (e.g., $SiCl_4$, $GeCl_4$, and $O_2$). Chemical reactions are then enabled to form glass particles that deposit themselves on the inside of the tube. An external heat source (such as a furnace) is required in PCVD to heat the substrate during deposition to ensure that the deposited glass is of a form that can be subsequently fused to clear glass. Once deposition is complete, the body is heated to collapse the substrate tube (in a manner similar to MCVD) and obtain a consolidated core rod in which the substrate tube constitutes the outer portion of the inner cladding material. To obtain a finished preform, an overcladding tube is typically placed over the core rod, and the components are heated and collapsed into the final preform structure.

These current methods of providing deposition of the preform materials using MCVD or PCVD exhibit deposition problems resulting from the relatively long deposition zone widths inherent in these processes (i.e., the extent of the deposition along the tube at any given instant of time). In MCVD, glass precursor vapors are introduced through a seal into the end of a substrate tube of length generally between one and three meters. The vapors encounter a reaction zone and are converted to oxides that deposit as soot on the inner tube wall. The widths of these zones of deposition are generally wider than the reaction zones and can be as much as 10-30% of the overall substrate tube length. As a result, the deposited material at the ends of the tube sometimes exhibits a non-uniform thickness, thereby adversely affecting the overall preform. Further, when multi-component compositions are being deposited (such as germanium silicates), the deposited regions tend to be nonuniform in composition as a function of zone position, due to different reaction rates of the glass constituents.

In PCVD, the reaction takes place within the created plasma region, the length of which is generally 10-20% of the overall substrate tube length. As in MCVD, there is a variation in reactivity within the plasma, resulting in variations in the thickness and/or composition of the reacted components. Therefore, the glass that is deposited on the inside of the substrate tube at any given time using a PCVD process can be non-uniform in terms of thickness and/or composition.

Moreover, the deposited cores in preforms made by these processes may vary in diameter and optical properties along the deposited length, also affecting the quality of the resulting fiber. Further, in MCVD, the soot formed in the reaction zone is capable of traveling the length of the tube and can potentially deposit itself at any point along the tube, regardless of the reaction zone location, thus leading to a certain degree of unpredictability in the deposition process.

In view of these deficiencies, there exists a need to improve the quality of materials deposited within substrate tubes.

SUMMARY OF THE INVENTION

The needs remaining in the prior art are addressed by the invention, which relates to a plasma technique for depositing material within a substrate tube and, more particularly, to an isothermal, low-pressure plasma process that results in creating a narrow reaction zone within which a more uniform and efficient deposition will occur.

In accordance with the present invention, isothermal, low pressure plasma operating conditions have been found that generate a narrow deposition zone upstream of the plasma (i.e., a location between the introduction of the reactant materials and the plasma). These operating conditions depend upon a number of interacting parameters. In essence, the key objective is to provide sufficient energy density for the creation of a narrow reaction zone, while not exceeding a heat level that would otherwise vaporize the inner surface of the substrate tube.

In some embodiments of the present invention, the exhaust end of the substrate tube is connected, through a vacuum system, to a scrubber apparatus for removal and neutralization of reaction by-products.

It is an aspect of the present invention that the isothermal, low pressure deposition process is particularly well-suited for the manufacture of optical fiber core rods that require precision core profiles (such as, for example, multimode core rods), since the deposition occurs in a very narrow zone (generally about one centimeter or less), in very thin layers, and does not require sintering.

A preferred embodiment of the present invention utilizes a concentrator-type coil in the plasma generator apparatus, so as to shape the generated electro-magnetic field such that a field-defined plasma can be used to create the molten glass particles at lower power.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
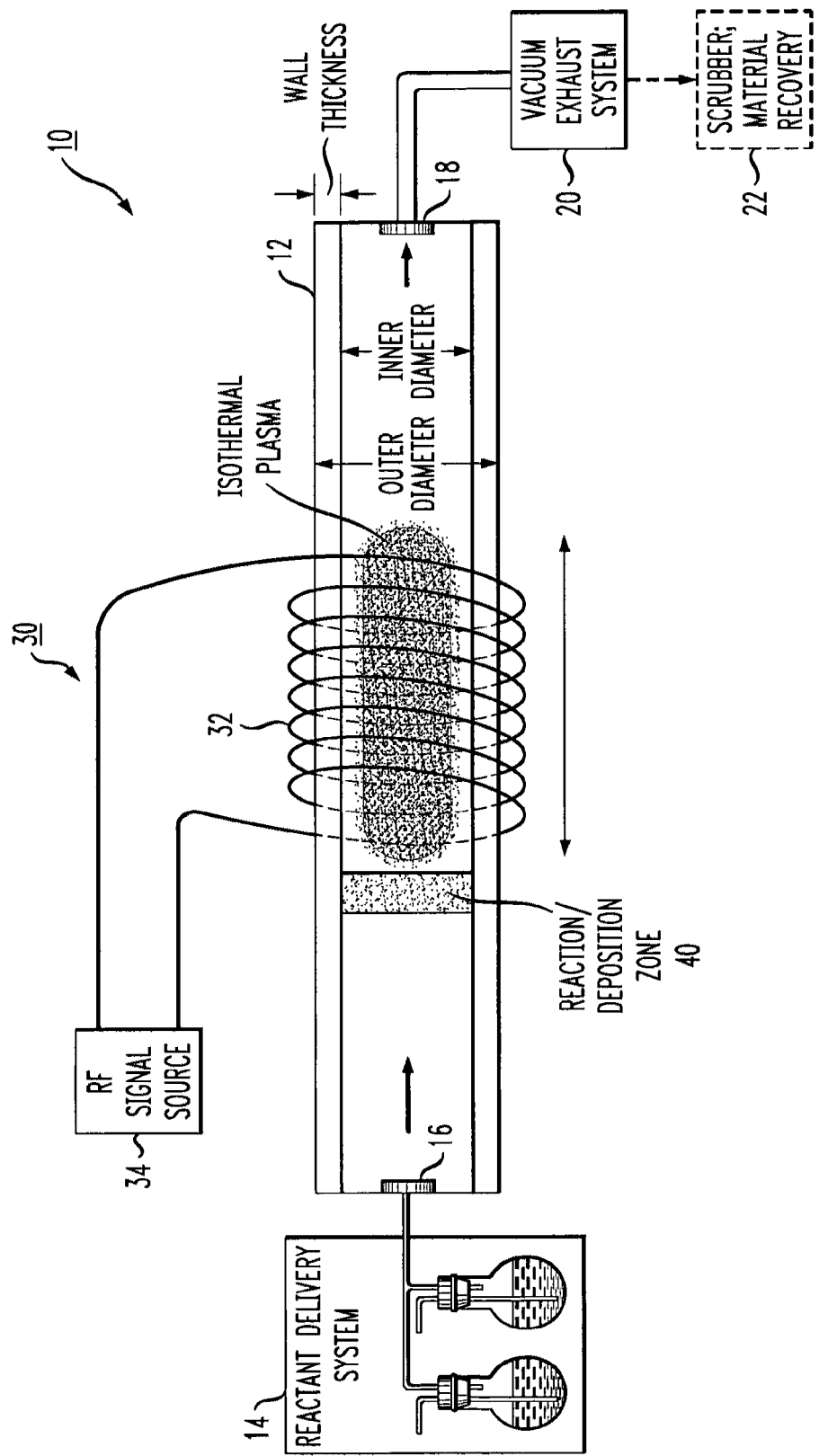
FIG. 1 illustrates an exemplary apparatus for performing the deposition process of the present invention.

FIG. 1 illustrates an exemplary apparatus 10 that may be used to practice the low pressure, isothermal deposition method of the present invention. As mentioned above and discussed in detail below, several operating parameters of apparatus 10 are controlled to allow for the formation of an extremely narrow deposition zone immediately upstream of the created plasma. In accordance with one embodiment of the present invention, the deposition conditions are controlled such that the narrow deposition zone occupies about only 1% of the length of a conventional substrate tube (as opposed to the 10-30% values associated with the prior art MCVD and PCVD processes). More broadly, the particularly conditions utilized with the teachings of the present invention result in a narrow deposition zone of one centimeter or less. A silica tube 12 is used in apparatus 10 as the substrate tube within which the deposition will occur, where the inner diameter (ID) and outer diameter (OD) of tube 12 are two of the operating parameters that are accounted for in developing the proper set of narrow zone deposition conditions, since the wall thickness also has an effect on the temperature of the inside wall and the reaction chemistry at the wall's surface.

Apparatus 10 further comprises a chemical delivery system 14 to deliver one or more chemical reactants (such as $GeCl_4$, $SiCl_4$, $C_2F_6$ and $O_2$) into substrate tube 12 through a first seal 16 formed within a first end of tube 12. Although not shown in FIG. 1 (and not essential to the operation of the apparatus), substrate tube 12 is typically mounted in a glass working lathe that maintains the integrity of first seal 16 while rotating tube 12. The opposing end of tube 12 is coupled through a second seal 18 to a vacuum exhaust system 20. Advantageously, exhaust system 20 may be connected to a scrubber apparatus 22, which is used for removal and neutralization of any reaction by-products. In an embodiment where substrate tube 12 is mounted in a rotating lathe, seals 16 and 18 may comprise a rotary type of seal that is capable of maintaining the integrity of the internal pressure within the tube. The use of a scrubber is considered to be optional.

As shown in FIG. 1, an isothermal plasma generator 30 is included in apparatus 10 and used to create a plasma of sufficient energy density within substrate 12 to provide the desired chemical reaction(s) with the delivered material. In most cases, generator 30 is mounted on a movable table (not shown) such that it can be traversed parallel to the axis of the mounted substrate tube, indicated by the double-ended arrow in FIG. 1. Isothermal plasma generator 30 comprises a resonant coil 32 that is positioned to surround a relatively short extent of tube 12, as shown in FIG. 1. An RF signal source 34 is coupled to resonant coil 32 and used to supply an RF signal thereto, thus creating the electro-magnetic field within tube 12. The combination of the incoming chemical reactants with the electro-magnetic field thus forms a plasma of an energy density sufficient to trigger the deposition of material on the inner surface of tube 12.

Although not necessary for the implementation of the process for all possible operating conditions the apparatus may also employ an external heating device (such as a furnace or linear burner) to control the temperature of the substrate tube during the deposition phase. The external heat assures that the deposited material adheres well to the substrate tube and avoids cracking of the material during deposition. As mentioned above, the thickness of the tube wall itself is one factor that is considered when determining if an external heating device is required.

In accordance with the present invention, an "isothermal" plasma is generated, meaning that both the ions and electrons in the plasma are at roughly the same temperature. In contrast, conventional PCVD systems use a non-isothermal plasma, where the electrons have a much higher energy that the ions. Importantly, the use of an isothermal plasma in the arrangement of the present invention allows for the reaction and deposition to occur immediately "upstream" of the plasma, shown as zone 40 in FIG. 1.

As used throughout this discussion, the term "upstream" is considered to refer to that portion of the substrate tube between first seal 16 and the created isothermal plasma. This particular upstream deposition mechanism results in the creation of molten glass particles (as opposed to soot) through homogeneous particle formation and growth, where these molten glass particles are then thermophoretically deposited upstream of the plasma, within zone 40. That is, the deposition occurs prior to the reactants entering the plasma region. A narrow heat zone (within a few inches of the center of the plasma) provides a high concentration of heat for reaction and thermophoretic deposition while the plasma further downstream heats the tube wall to prepare it for the deposit, increasing the temperature on the side wall of substrate tube 12. Thus, as plasma generator 30 traverses tube 12, the heated zone "upstream" of the plasma is the area where deposition occurs. The temperature of the inside wall is sufficient to melt the glass particles into molten form as they adhere to the inside wall, thus forming a uniform glass film. Importantly, the parameters of the inventive deposition process are controlled such that the reaction zone is not heated to a temperature at which the substrate will begin to vaporize (or decompose) instead of melt. The use of a low pressure within this arrangement (i.e., less than atmospheric pressure, for example, about 10 Torr), in combination with the isothermal plasma, results in this deposition zone being extremely narrow (on the order of 1% of the tube length, generally about one centimeter or less), having a definite "edge" at the boundary with the plasma. The low pressure also helps to reduce the heat content of the very high temperature plasma so that the substrate and reactants are not vaporized.

Figures 2, 4:
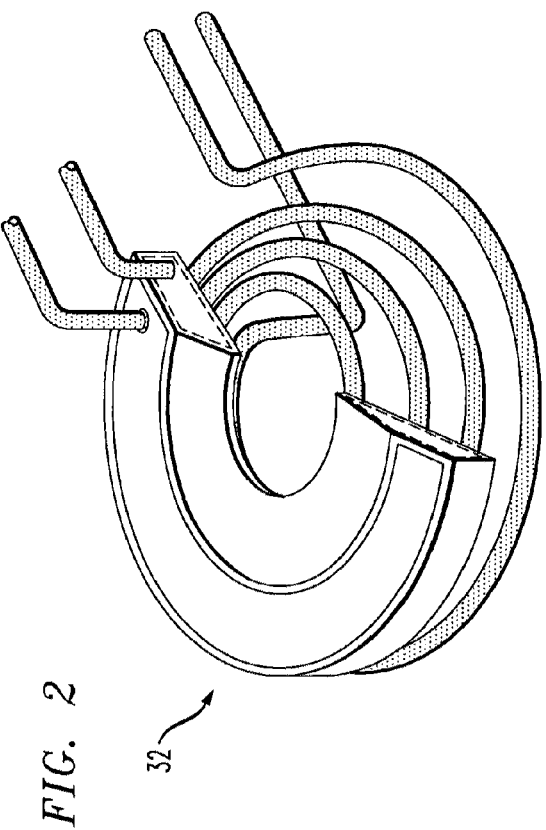
FIG. 2 is an isometric view of an exemplary concentrator coil that may be used as the resonant coil in the plasma-generating portion of the inventive apparatus.
FIG. 4 is a table of various sets of operating parameters useful in forming an isothermal, low pressure deposition plasma in accordance with the present invention.

In conventional RF plasma applications, it is typical to use a solenoid-shaped coil to induce the electro-magnetic field. In contrast, for the particular application of the present invention (i.e., isothermal, low pressure conditions), it has been found that a concentrator coil, i.e., a coil that shapes the field such that it is concentrated to a smaller volume, is of particular advantage. In one particular embodiment, a water-cooled RF concentrator coil 32 may be used to shape the generated plasma field such that a lower power source may be used. FIG. 2 is a simplified, isometric view of one exemplary water-cooled concentrator coil that may be used in plasma generator 30 of the present invention.

Figure 3:
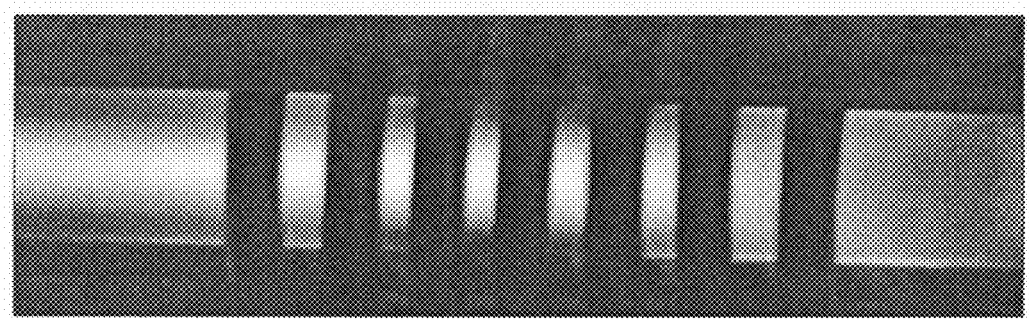
FIGS. 3(a) and (b) provide a comparison between a non-isothermal plasma (FIG. 3(a)) and an isothermal plasma (FIG. 3(b)
Figure 3:
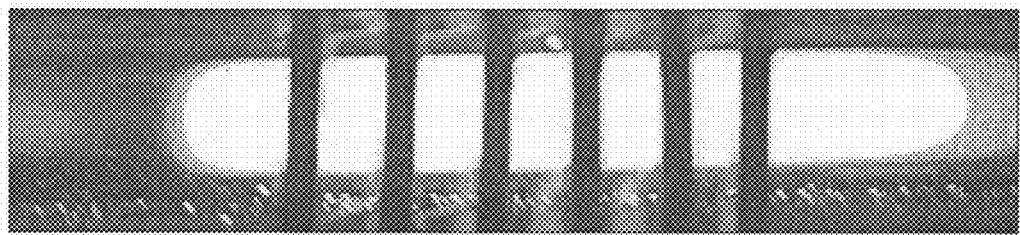

FIG. 3 contains a pair of photographs depicting the differences in plasma generation between a non-isothermal arrangement and an isothermal arrangement, where both are created at the same, low pressure using an RF source. FIG. 3(*a*) illustrates the generated non-isothermal plasma, which is shown as being rather expansive, spreading along a significant portion of the substrate length. In contrast, FIG. 3(*b*) illustrates the generated isothermal plasma, as used in the arrangement of the present invention. Clearly, the isothermal plasma is much more contained within the vicinity of the resonant coil, having well-defined boundaries, particularly on the upstream side. As mentioned above, it is the presence of this well-defined edge on the upstream side of the isothermal plasma that creates this very narrow transition region from "no plasma" to "plasma" where virtually all of the chemical reaction and deposition occurs (i.e., zone 40 as shown in FIG. 1). The isothermal plasma basically acts as a thermophoretic "plug", forcing virtually all of the particulate to deposit upstream of the plasma.

Key to achieving this plasma condition is providing a sufficient energy density to create the narrow upstream deposition zone without providing so much heat that the inner wall of the substrate tube is vaporized. There is a broad range of isothermal plasma operating conditions that have been found to provide this narrow deposition zone. In particular, the "zone" is defined as that region of energy density upstream of the plasma sufficient to bring about the reaction of the precursors and assure that the deposited material is molten glass, not soot. Several interdependent factors are taken into consideration, including (but not necessarily limited to) plasma power, substrate tube internal pressure (sub-atmospheric pressure), substrate tube inner diameter, substrate tube wall thickness, substrate tube external heating, reactant composition, reactant flow rate, plasma traverse velocity, plasma traverse length, and plasma induction source. The intent in choice of conditions is to a sufficient energy density that transfers a limited amount of heat to the substrate tube, thus minimizing the possibility of vaporizing the substrate tube wall if the temperature is too high, and avoiding the formation of bubbles in the processed glass if the temperature is too low. Various acceptable sets of conditions are shown in the table of FIG. 4, where it is to be understood that these values are exemplary only and many other combinations will provide the desired narrow reaction zone upstream of the plasma.

It is significant that the narrow deposition zone permits the deposition to be much more uniform along the entire length of the tube than the depositions achievable with conventional MCVD and PCVD processes. As a result, the process of the present invention allows for a higher yield of uniform quality optical fiber to be drawn from the preform created by the substrate tube. The inventive process also exhibits a higher deposition efficiency than other processes, leading to a further cost savings in terms of the expensive raw materials.

Isothermal plasma has previously been used for deposition inside a substrate tube. However, most of these prior art methods used an atmospheric pressure plasma, rather than the low-pressure (sub-atmospheric) plasma (e.g., 10 Torr) used in accordance with the present invention. At atmospheric pressure, the homogeneously formed particulate will be deposited as soot, subsequently fused by the plasma. Such plasma deposition at atmospheric pressure will also occur over a broader zone, since the particles under the influence of the higher gas density will be swept down the substrate tube by the gas flow. These prior art processes use the heat from the plasma to stimulate the reaction and deposition of the soot, then subsequently sinter the deposited soot layer. At atmospheric pressure, the vaporization temperature for the substrate is substantially higher, and heating the substrate to greater than 1700° C. does not present a problem. Low pressure RF plasma as used in the past was an argon plasma. Using the reported conditions, the deposition was described by the authors as being similar to that of microwave PCVD and that it occurred in the plasma without formation of particles.

An important distinction is that the inventive low pressure, isothermal plasma process apparently creates molten glass particles that are deposited on the substrate wall prior to entering the plasma (i.e., "upstream" of the plasma). No soot is created/deposited in the inventive process. Moreover, there is no evidence of additional deposition occurring in the plasma region; all deposition takes place in the narrow zone immediately upstream of the plasma. Also, the plasma is not used for any "fusing" operation in the method of the present invention. That is, since the deposited particles are glass particles and not soot, sintering is not required. In fact, achieving such fusion temperatures could be detrimental to the process.

While the above description has described a deposition process within a substrate tube, it is to be understood that the inventive features associated with creating a narrow deposition zone and eliminating a sintering process step may also be utilized with various other deposition schemes. For example, deposition on a planar surface (such as a silica wafer) can be similarly accomplished by creating the plasma in a low pressure chamber. Indeed, the depositions may occur on materials other than silica. A translating apparatus or spinning substrate with a flowing reactant stream can be used to deposit a uniform glass film. Alternatively, the depositions may be formed along the outer surface of a core rod disposed in a similar low pressure environment. Thus, the scope of the present invention is not considered to be limited to depositions within the inner walls of a substrate tube.

Various embodiments of the present invention have been described above, but it should be understood that they have been presented by way of example, and not limitation. It will be apparent to persons skilled in the relevant art that various changes in form and detail may be made therein without departing from the spirit and scope of the invention. Thus, the present invention should not be limited by any of the above-described embodiments, but should be defined only in accordance with the following claims and their equivalents.

What is claimed is:

1. A process for depositing a material on an inner wall of a substrate tube, the process comprising the steps of:
    disposing a silica substrate tube within a resonant coil of a plasma generator;
    presenting at least one chemical reactant through a first, delivery end of the substrate tube;
    maintaining internal pressure within the substrate tube to be less than atmospheric pressure;
    energizing the resonant coil to create an isothermal plasma within the substrate tube and heating the inner wall of the substrate tube; and
    depositing reactant products of the at least one chemical reactant on the inner wall of the substrate tube within only a narrow zone upstream of the created isothermal plasma without any deposition occurring within the isothermal plasma and the narrow zone being no greater than 1% of the length of the substrate tube.

2. The process as defined in claim 1 wherein the deposition conditions are controlled such that the narrow zone is confined to an area of approximately one centimeter or less in length.

3. The process as defined in claim 1 wherein the process further comprises the step of:
   evacuating reaction by-products through a vacuum system coupled to a second, exhaust end of the substrate tube.

4. The process as defined in claim 3 wherein the process further comprises the step of:
   scrubbing the evacuated reaction by-products to remove and neutralize the reaction by-products.

5. The process as defined in claim 1 wherein in performing the deposition, the narrow zone length is controlled by one or more parameters selected from the group consisting of: plasma generator power, substrate tube internal pressure, substrate tube inner diameter, substrate tube wall thickness, substrate tube external heating, chemical reactant composition, chemical reactant flow rate, isothermal plasma traverse velocity, isothermal plasma traverse length, and resonant coil configuration.

6. The process as defined in claim 1 wherein the internal pressure is maintained to be about 10 Torr.

7. The process as defined in claim 1 wherein the process comprises the further steps of forming an optical fiber core rod by:
   heating the substrate tube; and
   collapsing the heated substrate tube to form the optical fiber core rod.

8. A process of manufacturing an optical fiber preform comprising the steps of:
   introducing a reactant through an upstream end of a substrate tube;
   maintaining sub-atmospheric pressure within the substrate tube;
   generating an isothermal plasma field within the substrate tube at the sub-atmospheric pressure; and
   producing a reaction using the isothermal plasma field, the reaction occurring on the upstream side of the isothermal plasma field within only a narrow zone upstream of the created isothermal plasma without any deposition occurring within the isothermal plasma and the narrow zone being no greater than 1% of the length of the substrate tube.

9. The process of claim 8, further comprising the steps of:
   producing, as a result of the reaction, deposit materials from the reactant; and
   depositing the deposit materials on the inner surface of the substrate tube, the deposition occurring within the narrow zone on the upstream side of the isothermal plasma field.

10. A process of depositing a material on a component, the process comprising the steps of:
    presenting at least one chemical reactant to a deposition chamber;
    maintaining an internal pressure within the deposition chamber to be less than atmospheric pressure;
    energizing a resonant coil of a plasma generator to create an isothermal plasma in the vicinity of the component and heating the component; and
    depositing reactant products of the at least one chemical reactant on the component surface within only a narrow zone upstream of the crated isothermal plasma, without any deposition occurring within the isothermal plasma and the narrow zone being no greater than 1% of the length of the component.

11. The method of claim 10 where the component comprises a silica material.

12. The method of claim 10 where the component comprises a substrate.

13. The method of claim 10 where the component comprises a core rod.

* * * * *